US008751097B2

(12) United States Patent
De et al.

(10) Patent No.: US 8,751,097 B2
(45) Date of Patent: Jun. 10, 2014

(54) STATE ESTIMATION, DIAGNOSIS AND CONTROL USING EQUIVALENT TIME SAMPLING

(75) Inventors: Soumen De, Bangalore (IN); Pattada A. Kallappa, Bangalore (IN); Pulak Bandyopadhyay, Rochester Hills, MI (US); Siddhartha Mukhopadhyay, Kolkata (IN); Somnath Sengupta, Kolkata (IN); Alok Kanti Deb, Kolkata (IN)

(73) Assignees: GM Global Technology Operations LLC, Detroit, MI (US); Indian Institute of Technology Kharagpur, Kharagpur (IN)

( * ) Notice: Subject to any disclaimer, the term of this patent is extended or adjusted under 35 U.S.C. 154(b) by 235 days.

(21) Appl. No.: 13/104,629

(22) Filed: May 10, 2011

(65) Prior Publication Data
US 2012/0290168 A1 Nov. 15, 2012

(51) Int. Cl.
*G01M 17/00* (2006.01)
*G06F 19/00* (2011.01)
*G06F 7/00* (2006.01)

(52) U.S. Cl.
USPC ....... 701/30.2; 701/29.8; 701/30.4; 701/30.5; 703/2; 341/123; 341/155; 702/70; 702/71; 702/78; 702/79

(58) Field of Classification Search
USPC ................. 701/30.2, 29.8, 30.4–30.5; 703/2; 702/70–71, 78–79; 341/123, 155
See application file for complete search history.

(56) References Cited

U.S. PATENT DOCUMENTS 4,553,213 A * 11/1985 Hyatt ............................ 332/185
6,285,971 B1 * 9/2001 Shah et al. ........................ 703/2
(Continued)

FOREIGN PATENT DOCUMENTS

CN  102778360 A  * 11/2012
DE  102012102767 A1 * 11/2012
WO  WO00/46606  *  8/2000

OTHER PUBLICATIONS

Study on simulation of non-destructive testing for pipeline defects by ultrasonic guided waves; Hu Yang; Cheng Wang Cross Strait Quad-Regional Radio Science and Wireless Technology Conference (CSQRWC), 2011; vol. 1 Digital Object Identifier: 10.1109/CSQRWC.2011.6036930; Publication Year: 2011 , pp. 238-242.*

(Continued)

*Primary Examiner* — Cuong H Nguyen
(74) *Attorney, Agent, or Firm* — John A. Miller; Miller IP Group, PLC

(57) ABSTRACT

A method and system for using Equivalent Time Sampling to improve the effective sampling rate of sensor data, and using the improved-resolution data for diagnosis and control. Data samples from existing sensors are provided, where the sampling rate of the existing sensors is not sufficient to accurately characterize the parameters being measured. High-resolution data sets are reconstructed using Equivalent Time Sampling. High-resolution input data sets are used in a system model to simulate the performance of the system being measured. Results from the system model, and high-resolution output data sets from Equivalent Time Sampling, are provided to an estimator, which provides accurate estimation of measured quantities and estimation of quantities not measured. Output from the estimator is used for fault diagnosis and control of the system being measured.

16 Claims, 3 Drawing Sheets

(56) References Cited

U.S. PATENT DOCUMENTS

| | | | |
|---|---|---|---|
| 6,525,837 B1* | 2/2003 | Adkins et al. | 358/1.5 |
| 6,621,860 B1* | 9/2003 | Yamaguchi et al. | 375/226 |
| 6,687,629 B1* | 2/2004 | Yamaguchi et al. | 702/69 |
| 6,795,496 B1* | 9/2004 | Soma et al. | 375/226 |
| 6,816,102 B2* | 11/2004 | Pavicic | 341/155 |
| 6,975,251 B2* | 12/2005 | Pavicic | 341/50 |
| 7,254,185 B2* | 8/2007 | Chiu et al. | 375/316 |
| 7,577,542 B2* | 8/2009 | Vacar et al. | 702/124 |
| 7,746,058 B2* | 6/2010 | Nelson et al. | 324/121 R |
| 7,890,813 B2* | 2/2011 | Usynin et al. | 714/45 |
| 8,421,457 B2* | 4/2013 | Jacobson et al. | 324/309 |
| 2004/0051656 A1* | 3/2004 | Pavicic | 341/155 |
| 2005/0024249 A1* | 2/2005 | Pavicic | 341/155 |
| 2006/0047403 A1* | 3/2006 | Volponi et al. | 701/100 |
| 2008/0234930 A1* | 9/2008 | Cheok et al. | 701/207 |
| 2009/0237072 A1* | 9/2009 | Nelson et al. | 324/121 R |
| 2011/0044524 A1* | 2/2011 | Wang et al. | 382/131 |
| 2012/0290168 A1* | 11/2012 | De et al. | 701/30.2 |

OTHER PUBLICATIONS

Vision based Iterative Learning Control of a MEMS micropositioning stage with intersample estimation and adaptive model correction; White, P.J. et al.; American Control Conference (ACC), 2011; pp. 4293-4298.*

A Kind Improved Model of Information Fusion; Nantian Huang; Lin Lin; Business and Information Management, 2008. ISBIM '08. International Seminar on; vol. 2; Topic(s): Engineering Profession ; General Topics for Engineers (Math, Science & Engineering); Digital Object Id.: 10.1109/ISBIM.2008.143; Pub. Year: 2008 , pp. 269-272.*

Testing of telecom and datacom signals with a wide-bandwidth sampling oscilloscopes;Microwave Radar and Wireless Communications (MIKON), 2010 18th Inter. Conf.on; Jun. 14-16, 2010; Author(s): Rososkis, Jakovas Managing Director, UAB "Eltesta", Vilnius, Lithuania; Zaytsev, Oleg; pp. 1-4.*

An online approach for intracranial pressure forecasting based on signal decomposition and robust statistics; Han, Bin ; Muma, Michael ; Feng, Mengling ; Zoubir, Abdelhak M.; Acoustics, Speech and Signal Processing (ICASSP), 2013 IEEE Inter. Conf. on; Digital Object Id: 10.1109/ICASSP.2013.6638865; Pub. Year: 2013 , pp. 6239-6243.*

Experimental Analysis and Control-Oriented Modeling for Cyclic Variation of Cylinder Pressure in IC Engines; Li Po ; Shen Tielong ; Yasufumi, O.;Control Conference, 2007. CCC 2007. Chinese; Digital Object Identifier: 10.1109/CHICC.2006.4347199; Publication Year: 2007 , pp. 613-617.*

* cited by examiner

US 8,751,097 B2

STATE ESTIMATION, DIAGNOSIS AND CONTROL USING EQUIVALENT TIME SAMPLING

BACKGROUND OF THE INVENTION

1. Field of the Invention

This invention relates generally to data sampling techniques and, more particularly, to improving the effective sampling rate of sensor data using Equivalent Time Sampling, and using the improved-resolution data for fault diagnosis and control purposes.

2. Discussion of the Related Art

Automobiles and other complex systems make extensive use of data acquisition using a variety of sensors. The sensor data is then used for classical feedback control, fault diagnosis, supervisory control, and other purposes. A problem which is commonly encountered is that the sensor data cannot be provided at a high enough sampling rate to accurately characterize the parameter being measured. For example, if cylinder pressure is being measured in an automotive internal combustion engine, many data points are needed during each engine stroke in order to depict the rapid changes in pressure during compression, combustion, expansion, and exhaust. Yet, with an engine capable of running at high speed, it may not be possible or practical to obtain pressure sensor data at a high enough rate. This could be due to limitations of the sensor itself, or limitations of analog-to-digital converters, circuitry, other components, or a combination thereof.

One solution to the need for high-sampling-rate data is to increase the sampling rate of all data acquisition sensors and systems. However, given the large number of sensors used in vehicles and other complex systems, this would be a very costly solution. It would be preferable to use existing low-sampling-rate sensors, but manipulate the data such that it meets the needs of high-sampling-rate diagnostic and control applications. Such a technique would enable the benefits of the diagnostic and control applications, without the added expense and complexity of high-sampling-rate sensors and circuitry.

SUMMARY OF THE INVENTION

In accordance with the teachings of the present invention, a method and system are disclosed for using Equivalent Time Sampling to improve the effective sampling rate of sensor data, and using the improved-resolution data for diagnosis and control. Data samples from existing sensors are provided, where the sampling rate of the existing sensors is low and not sufficient to accurately characterize the parameters being measured. High-resolution data sets are constructed using Equivalent Time Sampling using sensor data acquired through existing low sampling rates. These constructed high-resolution input data sets are used in a system model to simulate the performance of the system being measured. Results from the system model, and high-resolution output data sets from Equivalent Time Sampling, are provided to an estimator, which provides accurate estimation of measured quantities and estimation of quantities not measured. Output from the estimator is used for fault diagnosis and control of the system being measured.

Additional features of the present invention will become apparent from the following description and appended claims, taken in conjunction with the accompanying drawings.

DETAILED DESCRIPTION OF THE EMBODIMENTS

The following discussion of the embodiments of the invention directed to state estimation, diagnosis and control using Equivalent Time Sampling is merely exemplary in nature, and is in no way intended to limit the invention or its applications or uses. For instance, an implementation example involving an automotive engine is described; however, the disclosed methods are equally applicable to other automotive systems, and to non-automotive systems where diagnostic and control functions could benefit from higher data sampling rates than available sensors can provide.

Equivalent Time Sampling (ETS) is a technique in which data sampling resolution can be improved virtually. ETS works by constructing a higher-resolution picture of an input signal by accumulating samples over many wave cycles. Because ETS samples the waveform over a number of cycles it can only be used to measure signals that are repetitive. ETS cannot be used for single-shot or non-repetitive signals. ETS is commonly used in digital storage oscilloscopes to provide a high-resolution waveform image.

Consider, for example, an engine running at 3000 revolutions per minute. This engine speed equates to 50 revolutions per second, or 25 complete intake/power cycles per second. In order to accurately measure a phenomenon in the engine, such as cylinder pressure, it may be necessary to have approximately 100 data points for each cycle. But it may be impossible, impractical or uneconomical to provide pressure sensors and associated circuitry which can take 2500 samples per second. ETS can be used in such a situation to construct a high-resolution data trace using the available low-sampling-rate sensor data.

Figure 1:
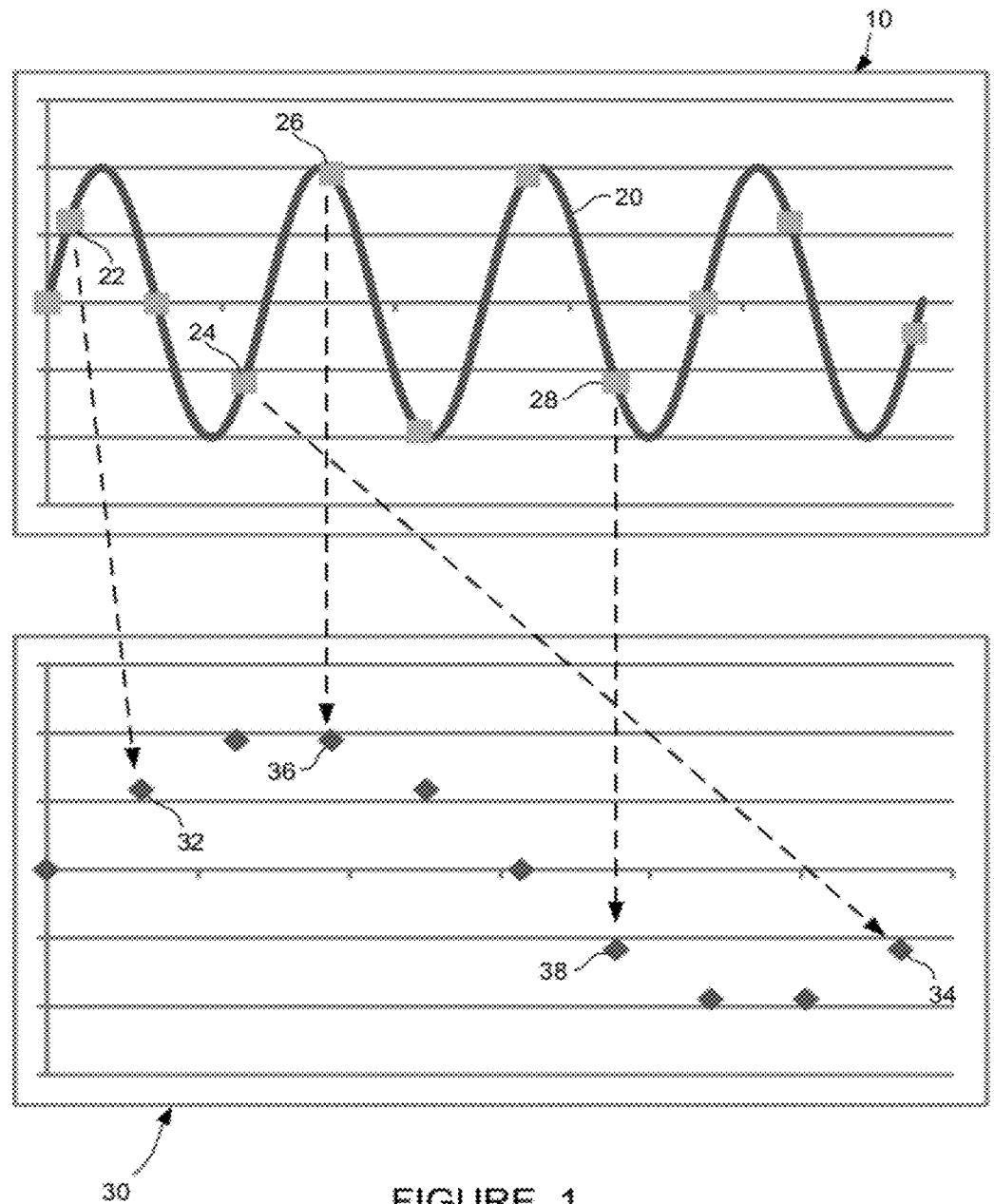
FIG. 1 is an illustration showing how Equivalent Time Sampling works to effectively increase data sampling resolution.

FIG. 1 is an illustration of how ETS works to effectively provide a higher data sampling rate than what is available from data sensors. Graph 10 includes a curve 20 which represents the value of some parameter as a function of time. The curve 20 contains data points 22, 24, 26 and 28. Other data points are also shown on the curve 20. The data points on the curve 20 are taken at a rate which is as high as possible given the limitations of the data sensor, but that rate is insufficient to capture the high frequency oscillations of the parameter. It can be observed that, if the data points on the graph 10 were connected by lines, the resulting plot would look nothing like the curve 20. A higher data sampling rate is needed in order to capture the oscillations of the curve 20.

Graph 30 contains data points reconstructed from the data points on the curve 20 using Equivalent Time Sampling. The time scale on the graph 30 is not the same as the time scale on the graph 10. Rather, the graph 30, containing ETS reconstructed data, represents a shorter time span than the graph 10 used as a source. In this example, the graph 30 contains data points taken from four cycles of data from the curve 20;

therefore, the x-axis of the graph 30 only spans one-fourth of the amount of time as the x-axis of the graph 10.

ETS reconstruction begins as the point 22 from the curve 20 is transposed to point 32 on the graph 30. It can be seen that the y-axis value of the point 32 is the same as that for the point 22. Likewise, the x-axis value of the point 32 is the same as that for the point 22, where the x-axis scale of the graph 30 is expanded. The point 24 from the curve 20 is transposed to point 34 on the graph 30. It can be seen that the point 24 is near the end of the first cycle of data on the curve 20, and the point 34 is near the end of a cycle of data points on the graph 30. Again, the x-axis and y-axis values of the points 24 and 34 are the same. The point 26 from the curve 20 is transposed to point 36 on the graph 30. Because the point 26 exists on the second cycle of data from the curve 20, and only one cycle of data is being constructed on the graph 30, the x-axis position of the point 36 must be adjusted by one wavelength. That is, the x-axis (time) value of the point 36 is equal to the x-axis value of the point 26, minus one period. The y-axis values of the points 26 and 36 are of course the same.

Similarly, the point 28 from the curve 20 is transposed to point 38 on the graph 30. Because the point 28 exists on the third cycle of data from the curve 20, the x-axis position of the point 38 must be adjusted by two wavelengths. This process can be repeated for all data points on the curve 20, resulting in the data points shown on the graph 30. It can be observed that the data points on the graph 30 represent a high-fidelity reconstruction of a cycle of data from the curve 20. This is the advantage that Equivalent Time Sampling offers when measuring cyclic data, such as the curve 20, with relatively low-sampling-rate data sensors. ETS can be used to improve effective data sampling rates by up to a factor of 10 or more.

If, instead of time, the horizontal axis of the graphs 10 and 30 measured crankshaft angle in an engine (with crank angle running from 0 to 720 degrees, representing the two revolutions of a two-stroke-per-cycle engine), then the ETS transposition described above would be even simpler, as all data points could be plotted directly as a function of crank angle on the reconstructed data graph 30.

As mentioned above, ETS is a technique used in digital storage oscilloscopes to improve the resolution of a measured waveform. ETS can also be used in controllers for complex systems, such as automotive engines, to effectively improve the sampling rate of sensor data, and enable the improved-resolution data to be used in system models and for fault diagnosis and supervisory control. This is discussed in detail below.

Figure 2:
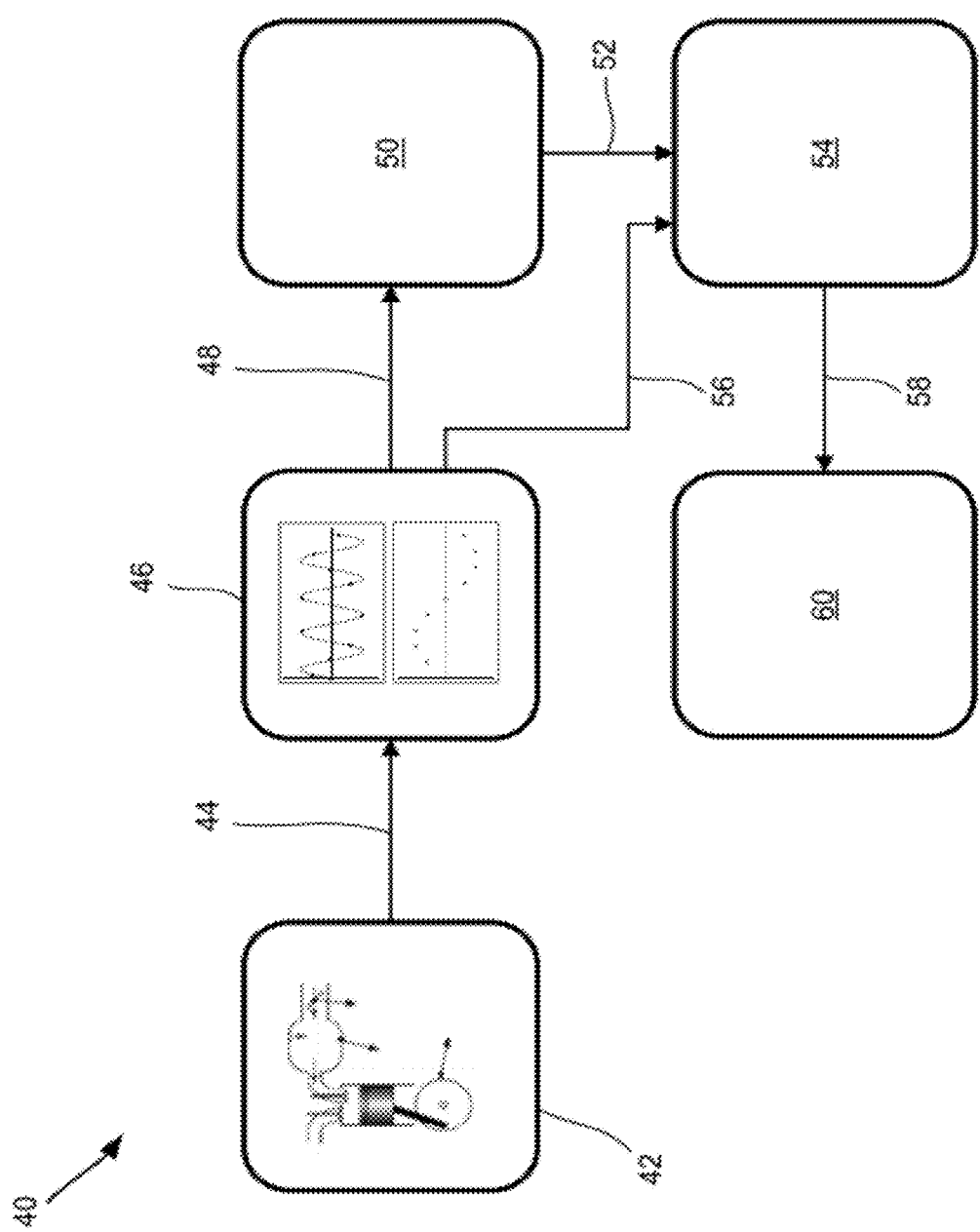
FIG. 2 is a block diagram of a system which uses Equivalent Time Sampling and a system model to improve control and fault diagnosis for an engine.

FIG. 2 is a block diagram of a system 40 which uses Equivalent Time Sampling and a system model to improve fault diagnosis and supervisory control for an engine. Engine 42 is equipped with numerous sensors (not shown). Sensors on the engine 42 may include a throttle position sensor, an intake manifold pressure sensor, a crankshaft position sensor, a cylinder pressure sensor, and an exhaust gas oxygen sensor, for example. During operation of the engine 42, low-sampling-rate data is provided on line 44 to an ETS module 46. The ETS module 46 operates to transform the low-sampling-rate data into high-sampling-rate data, using many cycles of low-sampling-rate data to construct each cycle of high-sampling-rate data, as discussed previously. High-sampling-rate data for input parameters, such as throttle position, mass air flow rate, and intake manifold pressure, are provided on line 48 to a system model 50.

The system model 50 uses the high-sampling-rate data on the line 48 as inputs, and simulates the performance of the engine 42 based on these inputs. In this case, the system model 50 could be a combustion model for the engine 42. The system model 50 could be a so-called black box model, which performs a data-driven look-up of output parameters based on the value of input parameters, or a so-called white box model, which uses physics-based simulation techniques to predict performance and outputs based on input values. In either case, the system model 50 provides output data on line 52 to an estimator module 54. The ETS module 46 also provides high-sampling-rate output data on line 56 to the estimator module 54. Output data provided on the line 56, as measured on the engine 42 and reconstructed by the ETS module 46, may include cylinder pressure, for example. The system model 50 would also provide a simulated cylinder pressure signal on the line 52.

The estimator module 54 can perform several functions, including comparing the high-sampling-rate output data on the line 56 with the system model output data on the line 52, to look for anomalies. The estimator module 54 can also provide accurate estimation of measured quantities from data on the line 56, and estimation of quantities not measured or not measurable if such parameters are included in the system model 50 and provided on the line 52. The estimator module 54 may use any of a number of numerical techniques, such as Kalman filtering or extended Kalman filtering, to characterize the performance of the engine 42 based on the data provided on the lines 52 and 56. Such techniques, as would be understood by those skilled in the art of estimation techniques and numerical methods, estimate the true values of measurements which are observed over time and which contain noise and other inaccuracies.

The estimator module 54 provides operational and performance data regarding the engine 42 on line 58 to an applications module 60. The operational and performance data on the line 58 is based on the effective high-sampling-rate data provided by the ETS module 46. Many functions can be performed by the applications module 60 using high-sampling-rate output data which would not be possible with low-sampling-rate data. One broad category of applications is fault diagnosis. As an example, a cylinder pressure trace could be analyzed, resulting in a determination that the fuel injector for that cylinder is partially clogged. Although not indicative of an emergency, this type of incipient failure can be detected, and appropriate diagnostic trouble code registration and driver notification performed, before the fault leads to an engine failure or a walk-home situation. Another example would be the detection of an exhaust leak based on evaluation of the exhaust manifold pressure trace. These types of fault detections and diagnoses would not be possible without the ETS module 46, as the cylinder pressure or exhaust manifold data signals would not be of sufficient accuracy or resolution to allow effective identification of the faults.

Another category of applications available in the applications module 60 is supervisory control. For example, the cylinder pressure data could be analyzed, as output by the estimator module 54, to determine if fuel injection timing and spark timing are optimized for the current operating conditions of the engine 42. Injection or spark timing could be advanced or retarded based on the nature of the cylinder pressure curve. Again, without the increase in effective sampling rate made possible by the ETS module 46, the cylinder pressure data signal would not be sufficiently accurate to allow effective supervisory control.

Piston engines represent a natural opportunity for the application of ETS, as their operation is cyclic and thus lends itself to the ETS technique. Also, highly sophisticated combustion and performance models exist for engines, but the output of these models is only as good as the quality of the input data. As discussed above, ETS can be used to improve data quality for system model inputs, using existing low-sampling-rate sensors. ETS-based data enhancement techniques are applicable to many types of systems; the system 40, described in terms of application to sensor data from a piston engine, is used here as an example. In practice, the ETS module 46, the system model 50, the estimator module 54, and the applications module 60 could be included in a controller, or electronic control unit (ECU).

Figure 3:
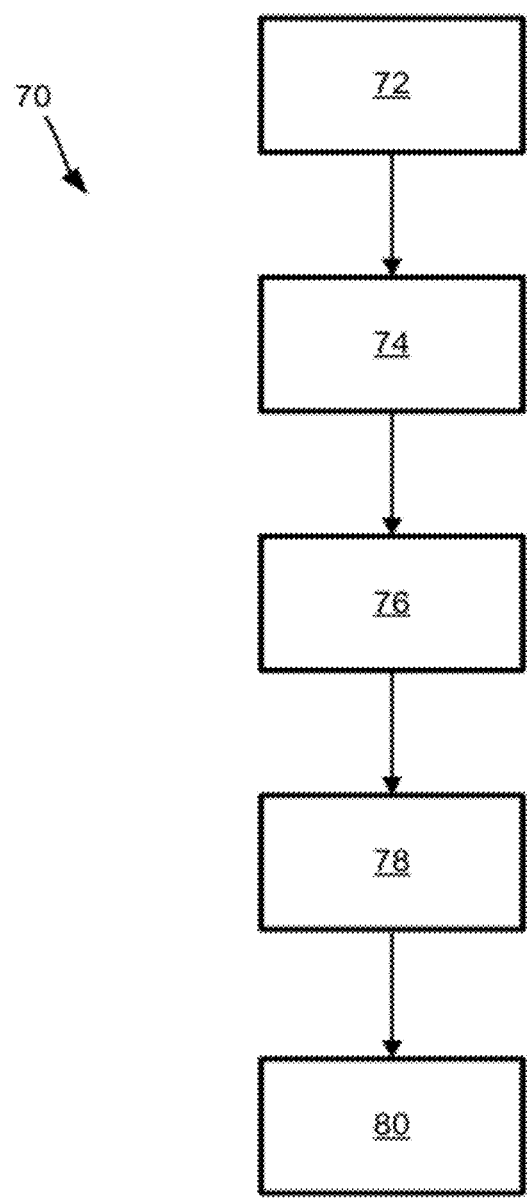
FIG. 3 is a flow chart diagram of a method for using Equivalent Time Sampling along with a system model to improve control and fault diagnosis functions for a hardware system.

FIG. 3 is a flow chart diagram 70 of a method for using Equivalent Time Sampling along with a system model to improve control and fault diagnosis functions for a hardware system. At box 72, low-sampling-rate sensor data is acquired from sensors on a hardware system, such as the engine 42. At box 74, Equivalent Time Sampling is applied to the low-sampling-rate data to produce a reconstructed high-sampling-rate signal. At box 76, a system model uses the high-sampling-rate ETS data as input to perform a simulation of the hardware system. At box 78, numerical estimation methods are applied to the output of the system model from the box 76 and the high-sampling-rate ETS output data from the box 74. As discussed previously, the estimation methods can include Kalman filtering or other techniques for minimizing noise and other inaccuracies in the output data, thus accurately characterizing the performance of the hardware system.

At box 80, fault detection and diagnosis, and supervisory control can be performed using the output of the estimations at the box 78. As discussed previously, fault detection can be based on evaluation of an ETS-reconstructed output signal, evaluation of a system model output signal, or a comparison between the two. Supervisory control operations can likewise be based on ETS-reconstructed output or simulated output. In either case, the ETS reconstruction of the input signals and the output signals enables accurate estimation and effective evaluation of system performance.

The methods described above have been shown to be effective in testing of engines with traditional low-sampling-rate data sensors. By applying Equivalent Time Sampling techniques to real-time data acquisition, and using the ETS-enhanced data in supervisory control and fault detection systems, significant improvements have been demonstrated in the signal quality of low-sampling-rate sensor data. This improvement can be realized without incurring the cost and complexity of high-sampling-rate sensors and data acquisition electronic hardware, thus making the disclosed methods attractive to manufacturers of vehicles and other systems.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for state estimation, diagnosis and control of a hardware system, said method comprising:
    acquiring low-sampling-rate data from the hardware system;
    applying, using a microprocessor, Equivalent Time Sampling (ETS) to the low-sampling-rate data to construct high-sampling-rate data;
    using the high-sampling-rate data constructed via ETS in a system model to simulate performance of the hardware system;
    characterizing performance of the hardware system using numerical estimators applied to output from the system model and the high-sampling-rate data, including comparing the high-sampling-rate data to the output from the system model; and
    using output from the numerical estimators for monitoring and configuring operation of the hardware system.

2. A state estimation, diagnosis and control system for a machine, said system comprising:
    one or more sensors for acquiring low-sampling-rate data from the machine in operation; and
    a controller in communication with the sensors and the machine, said controller including a microprocessor configured with an algorithm including:
        an Equivalent Time Sampling (ETS) module for using the low-sampling-rate data from the sensors to construct high-sampling-rate data;
        a system model for simulating performance of the machine using the high-sampling-rate data constructed via ETS as input;
        an estimator module for characterizing the performance of the machine using output of the system model and the high-sampling-rate data, including comparing the high-sampling-rate data to the output of the system model; and
        an applications module for monitoring and configuring operation of the machine based on output of the estimator module.

3. The system of claim 2 wherein the machine is an engine in an automobile.

4. The method of claim 1 wherein characterizing performance of the hardware system using numerical estimators includes using Kalman filtering or extended Kalman filtering.

5. The method of claim 1 wherein using output from the numerical estimators for monitoring and configuring operation of the hardware system includes fault detection and diagnosis for the hardware system.

6. The method of claim 1 wherein using output from the numerical estimators for monitoring and configuring operation of the hardware system includes supervisory control of the hardware system.

7. The method of claim 1 wherein the hardware system is an engine in an automobile.

8. The method of claim 7 wherein the system model includes simulation of air intake, fuel delivery, combustion and exhaust in the engine.

9. A method for state estimation, diagnosis and control of an engine in an automobile, said method comprising:
    acquiring low-sampling-rate cylinder pressure data from the engine;
    applying, using a microprocessor, Equivalent Time Sampling (ETS) to the low-sampling-rate cylinder pressure data to construct high-sampling-rate cylinder pressure data;
    using the high-sampling-rate cylinder pressure data constructed via ETS in a system model to simulate performance of the engine;
    characterizing performance of the engine using numerical estimators applied to the high-sampling-rate cylinder pressure data and output from the system model, including comparing the high-sampling-rate cylinder pressure data to the output from the system model, where characterizing performance of the engine includes characterizing air intake, fuel delivery, combustion and exhaust in the engine; and
    using output from the numerical estimators for monitoring and configuring operation of the engine.

10. The method of claim 9 wherein characterizing performance of the engine using numerical estimators includes using Kalman filtering or extended Kalman filtering.

11. The method of claim 9 wherein using output from the numerical estimators for monitoring and configuring operation of the engine includes fault detection and diagnosis for the engine.

12. The method of claim 9 wherein using output from the numerical estimators for monitoring and configuring operation of the engine includes supervisory control of the engine.

13. The system of claim 3 wherein the system model simulates air intake, fuel delivery, combustion and exhaust in the engine.

14. The system of claim 2 wherein the applications module includes fault detection and diagnosis for the machine.

15. The system of claim 2 wherein the applications module includes supervisory control of the machine.

16. The system of claim 2 wherein the estimator module uses Kalman filtering or extended Kalman filtering.

* * * * *